3,260,750
PROCESS FOR PREPARING HYDRAZOBENZENES

Adnan A. R. Sayigh, North Haven, and Alec Odinak, New Haven, Conn., assignors to The Upjohn Company, Kalamazoo, Mich., a corporation of Delaware
No Drawing. Filed Oct. 14, 1963, Ser. No. 316,177
7 Claims. (Cl. 260—569)

This invention relates to a surprisingly improved process for the production of o-(lower-alkyl)-hydrazobenzenes from 2-(lower-alkyl)-nitrobenzenes.

The process and products can be illustratively represented by the following sequence of reactions:

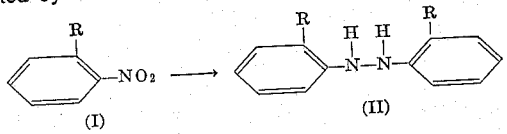

wherein R is a lower alkyl.

Hydrogenation of o-alkylnitrobenzenes in the presence of hydrogen, a hydrogenating catalyst and alkali base to yield hydrazoalkylbenzenes is well known. However, due to the various possible intermediates, and to the fact that the o-hydrazoalkylbenzenes readily hydrogenate further to o-alkylanilines, it has always been difficult to obtain o-hydrazoalkylbenzenes in good yield.

Thus, when o-nitrotoluene was reduced according to Henke, U.S. Patent 2,233,129, with 2–12% sodium hydroxide in isopropanol, o-toluidine was the sole isolated product in yields upwards of 90%. Changing the solvent to isopropyl alcohol-water mixtures and methanol-water mixtures did not alter the result. In other hydrogenations of o-nitrotoluene in isopropanol, with palladium catalyst as presently available, under the conditions of Henke, U.S. Patent 2,233,129, 5% of the desired product 2,2'-dimethylhydrazobenzene was isolated, while more than 90% was the completely reduced amino product, toluidine.

It was therefore a complete surprise to find that a very high yield of the desired end product o-(lower-alkyl)-hydrazobenzene could be obtained, when the reaction instead of using one stage, was carried out in two stages:

(1) A hydrogenation at low temperature, between 0° and 40° C., until about 1½ moles of hydrogen per mole of alkylnitrobenzene are consumed; and (2) A hydrogenation at an elevated temperature, between about 60° to about 100° C. until a total of about 2½ moles of hydrogen per mole of starting alkylnitrobenzene are consumed.

This completely new and unsuggested method permits production of 2,2'-dialkylhydrazobenzene in yields of more than 80%.

Besides the above two-stage procedure of this novel process, the process also differs from the art-known methods by employing water-free methanol as the solvent of choice and at least 1 mole, but preferably 2 to 4 moles of caustic (sodium hydroxide or potassium hydroxide) per mole of alkylnitrobenzene.

The 2,2'-dialkylhydrazobenzenes obtained in the process of said invention are useful intermediates in the production of many organic dyes and are particularly useful in color photography. 2,2'-dimethylhydrazobenzene has been a commercial product for several decades. The object of the present invention is to produce these materials in high yields for a cheap price.

In carrying out the method of the novel invention, it was found that best results were obtained when the reduction was carried out at two different temperatures: the first stage of the hydrogenation at a temperature between 0° to 40° C. and preferably between 10° to 35° C.; the second stage at a temperature between 60° to 100° C. and preferably 80° to 90° C. In the first stage the hydrogenation is carried out until approximately 1½ moles of hydrogen per mole of alkylnitrobenzene are consumed. In the second stage an additional mole of hydrogen per mole of original starting material is consumed. It was further found that the ratio of sodium hydroxide to the o-alkylnitrobenzene is critical and that sodium hydroxide should be used at least in a quantity of 1 mole of caustic to 1 mole of o-alkylnitrobenzene, but preferably in a ratio of 3 or 4 moles of caustic per mole of o-alkylnitrobenzene.

It was also determined that due to the high amount of caustic to be dissolved or suspended, methanol was the best solvent. The use of ethanol or other higher alcohols severely reduced the yield of the desired 2,2'-dialkylhydrazobenzene. Similarly, the presence of water in the solvent reduces the yield of the desired product.

The hydrogenation catalyst may be palladium, platinum, rhodium or other noble metal in finely dispersed form on an inert carrier, e.g., barium or calcium sulfate, activated charcoal, and the like. Preferred is a palladium catalyst, 5 parts of palladium dispersed on 95 parts of carbon, usually activated charcoal. The catalyst is used at a rate of at least 1 g. of catalyst per 1 mole of nitro compound. Preferably from 2 to 5 g. of catalyst are used per mole of alkylnitrobenzene.

The hydrogen pressure, maintained during the hydrogenation, is not critical. Pressures between 50 to 100 lbs. per square inch are preferred, though the method is operative between pressures of 15–150 lbs. per square inch. High pressure can be used but is not advantageous and would require more expensive equipment.

The compounds considered to be reduced in the method of this invention are o-(lower-alkyl)-nitrobenzenes in which the alkyl contains from 1 to 8 carbon atoms, inclusive. Representative starting materials include: o-nitrotoluene, o-ethylnitrobenzene, o-propylnitrobenzene, o-isopropylnitrobenzene, o-butylnitrobenzene, o-isobutylnitrobenzene, o-tertiarybutylnitrobenzene, o-hexylnitrobenzene, o-heptylnitrobenzene, o-octylnitrobenzene, o-2,-2,3,3-tetramethylbutylnitrobenzene, and the like.

The following examples are illustrative of the present invention but are not to be construed as limiting.

Example 1.—2,2'-dimethylhydrazobenzene

Into a stainless steel reaction vessel, equipped with a stirrer, vent and gas inlet, are placed 7,370 ml. of methanol containing 1550 g. of sodium hydroxide. Into this solution is thoroughly mixed 9 g. of catalyst, a 5% by weight dispersion of palladium-on-charcoal, then 1258 g. of o-nitrotoluene. The apparatus is purged with nitrogen, then hydrogen is admitted at such a rate as to maintain the pressure at about 80 p.s.i.g. and, at the same time, the temperature is maintained at between 20 to 30° C. by cooling when required. Cooling is accomplished by circulating brine through coils immersed in the reaction mixture.

When about 1.5 moles of hydrogen per mole of nitrotoluene had reacted, the temperature was raised over a period of two hours to 90° C. and held there while hydrogenation is continued until complete, as shown by cessation of hydrogen uptake.

The reaction mixture is cooled and filtered. The solids obtained from this filtration are taken up in hot chlorobenzene and filtered to remove catalyst. The hot chlorobenzene and filtrate is then concentrated and cooled to give by crystallization the desired 2,2'-dimethylhydrazobenzene. It is filtered off to yield a total of 7978 g., 82% of theory, of white solid, 2,2'-dimethylhydrazobenzene melting at 165° C.

From the alcoholic mother liquor there is obtained, by extraction with benzene and distillation of the extract, 90 g., or 9.2% of theory, of o-toluidine boiling at 200° C. at 1 mm.

*Example 2.—2,2'-dimethylhydrazobenzene*

In the same manner as given in Example 1 using one mole of nitrotoluene, 2 moles of sodium hydroxide and keeping the temperature in the first stage to between 5° C. and 30° C., and in the second phase at about 85° C., gave after isolation as shown in Example 1 a yield of 91% of 2,2'-dimethylhydrazobenzene.

*Example 3.—2,2'-diethylhydrazobenzene*

In the same manner as in Example 1, 1250 g. of o-nitroethylbenzene were hydrogenated in 7370 ml. of methanol containing 1550 g. of sodium hydroxide and in the presence of 18 g. of a 5% by weight dispersion of palladium-on-charcoal. Hydrogen was admitted and maintained at a pressure of about 75 to 85 p.s.i.g. The temperature in the first stage was maintained between 18–20° C. and held there until hydrogenation was complete, as shown by cessation of hydrogen uptake. After cooling the mixture was filtered and extracted with chlorobenzene, the chlorobenzene layer was concentrated and cooled, yielding upon crystallization the desired 2,2'-diethylhydrazobenzene.

*Example 4.—2,2'-dibutylhydrazobenzene*

Two moles of o-(n-butyl)nitrobenzene, 8 moles of sodium hydroxide, and 1400 ml. of methanol containing 4 g. of palladium-on-charcoal (5% of palladium by weight) dispersed in the solution were placed into a container suitable for hydrogenation. The container was first purged with nitrogen, whereafter hydrogen was admitted to maintain the pressure at about 75 p.s.i.g. The temperature was maintained between 10–25° C. by cooling when necessary. After two hours the temperature was raised gradually over a 2-hour period to 90° C. and held there while the hydrogenation continued. Upon completion of the hydrogenation, the reaction mixture was cooled, filtered, and extracted with chlorobenzene to yield 2,2'-dibutylhydrazobenzene in 80% yield.

*Example 5.—2,2'-dioctylhydrazobenzene*

In the same manner as in Example 4, two moles of o-octylnitrobenzene were hydrogenated in the presence of sodium hydroxide and palladium-on-charcoal, in a methanol solution, first at a temperature between 18–25° C., and then at a temperature of 90° C. to give 2,2'-dioctylhydrazobenzene.

In the same manner as given in Examples 1 through 5 using as starting materials o-nitroalkylbenzene in which the alkyl group has from 1 to 8 carbon atoms, such as propyl- and isopropylnitrobenzene, o-pentylnitrobenzene, o-hexylnitrobenzene, o-heptylnitrobenzene, and o-alkylnitrobenzenes in which the alkyl group is branched such as isobutyl, isopentyl, neopentyl, β,β-dimethylbutyl, β,γ-dimethylbutyl, β,β-dimethylhexyl, β,δ-dimethylhexyl, β-methylhexyl and the like, yields the corresponding 2,2'-dialkylhydrazobenzene such as 2,2'-di-(n-propyl)-hydrazobenzene, 2,2'-diisopropylhydrazobenzene, 2,2'-diisobutylhydrazobenzene, 2,2'-diisopentylhydrazobenzene, 2,2'-di-(n-pentyl)-hydrazobenzene, 2,2'-di-(n-hexyl)-hydrazobenzene, 2,2'-di-(β,β-dimethylbutyl)-hydrazobenzene, 2,2'-di-(β,β-dimethylhexyl)-hydrazobenzene, 2,2'-di(β,γ-dimethylbutyl)-hydrazobenzene, 2,2'-di-(β,γ-dimethylbutyl)-hydrazobenzene, 2,2'-dineopentylhydrazobenzene, 2,2'-di-(β,δ-dimethylhexyl)-hydrazobenzene, 2,2'-di-(β-methylhexyl)-hydrazobenzene, and the like.

We claim:

1. In a process for the production of an o,o'-di(lower-alkyl)hydrazobenzene by catalytic hydrogenation of the corresponding o-(lower-alkyl)nitrobenzene in the presence of a noble metal hydrogenation catalyst and an alkali metal hydroxide the improvement which comprises initially maintaining the temperature of the reaction mixture within the range of about 0° C. to about 40° C. until the amount of hydrogen consumed corresponds to approximately 1.5 moles per mole of starting o-(lower-alkyl)nitrobenzene, and thereupon raising the reaction temperature to between about 60° C. and about 100° C. until further uptake of hydrogen ceases.

2. The process of claim 1 wherein the o-(lower-alkyl) nitrobenzene employed as starting material is o-nitrotoluene.

3. The process of claim 1 wherein the alkali metal hydroxide is employed in an amount within the range of about 3 moles to about 4 moles per mole of o-(lower-alkyl)nitrobenzene.

4. The process of claim 1 wherein the hydrogenation catalyst is palladium-on-charcoal.

5. In a process for the production of an o,o'-di(lower-alkyl)hydrazobenzene by catalytic hydrogenation of the corresponding o-(lower-alkyl)nitrobenzene in solution in methanol and in the presence of alkali metal hydroxide and palladium-on-charcoal catalyst, the improvement which comprises employing the alkali metal hydroxide in an amount corresponding to about 3 moles to about 4 moles per mole of o-(lower-alkyl)nitrobenzene and maintaining the temperature of the reaction mixture within the range of about 0° C. to about 40° C. until the amount of hydrogen consumed corresponds to approximately 1.5 moles per mole of starting o-(lower-alkyl)nitrobenzene and thereupon raising the reaction temperature to between about 60° C. and about 100° C. until further uptake of hydrogen ceases.

6. The process of claim 5 wherein the o-(lower-alkyl) nitrobenzene is o-nitrotoluene.

7. The process of claim 5 wherein the alkali metal hydroxide is sodium hydroxide.

References Cited by the Examiner
UNITED STATES PATENTS

| | | | |
|---|---|---|---|
| 2,383,134 | 8/1945 | Lacey et al. | 260—569 |
| 2,600,000 | 6/1952 | Kamlet | 260—569 |
| 2,744,935 | 5/1956 | Johner | 260—569 |
| 3,156,724 | 11/1964 | Werner et al. | 260—569 |

CHARLES B. PARKER, *Primary Examiner.*

R. V. HINES, *Assistant Examiner.*